Patented Feb. 21, 1933

1,898,268

UNITED STATES PATENT OFFICE

ROBERT L. SIBLEY, OF NITRO, WEST VIRGINIA, ASSIGNOR TO THE RUBBER SERVICE LABORATORIES COMPANY, OF AKRON, OHIO, A CORPORATION OF OHIO

VULCANIZATION OF RUBBER

No Drawing.   Application filed January 19, 1931.   Serial No. 509,878.

The present invention relates to the vulcanization of rubber by a new and improved process wherein a new type of rubber vulcanization accelerator is employed. The manufacture and means of employing the preferred new class of rubber vulcanization accelerators are fully set forth hereinafter and will be readily understood from the following description and examples of a preferred mode of carrying out the invention.

The preferred new class of accelerators comprise a reaction product of an amino derivative of an oxy-di-aryl-alkylidene compound and a mercaptoarylthiazole. The preferred class of compounds may be incorporated alone in a rubber mix as a rubber vulcanization accelerator, but preferably are employed in conjunction with a basic organic nitrogen-containing accelerating compound as a mixed accelerator. More specifically, however, the preferred class of compounds are employed in conjunction with an amine accelerating compound, for example, diphenylguanidine, as a mixed accelerator.

The following is one example of a preferred method of manufacturing one of the new type of accelerating compounds.

Substantially two molecular proportions of 2-mercapto-benzothiazole and substantially one molecular proportion of the condensation-product of substantially one molecular proportion of beta-beta-dioxydinaphthylmethane with substantially two molecular proportions of 2,4-diamido-diphenylamine were mixed together in a suitable solvent, for example, ethyl alcohol, and heated, if preferred, to a temperature of approximately 100° C. for a period of approximately one hour. The solvent used, for example, ethyl alcohol, was then removed by any convenient means, as for example distillation or evaporation. The product thus formed was a brittle resin, which could readily be ground to a fine powder.

A portion of the material prepared as described above was incorporated in the usual manner in a rubber tread stock comprising 100 parts of smoked sheet rubber,
40 parts of carbon black,
10 parts of zinc oxide,
3 parts of sulfur,
2 parts of a blended mineral oil and rosin,
1.25 parts of the 2-mercaptobenzothiazole derivative of the condensation-product of beta-beta-dioxy-dinaphthylmethane and 2,4-diamido-diphenyl-amine.

The rubber stock thus compounded was then cured in the usual manner by heating in a press for different periods of time at the temperature given by 40 pounds of steam pressure per square inch. The vulcanized rubber product on testing was found to possess the following tensile and modulus characteristics:

Table I

| Cure | | Modulus of elasticity in lbs/in² at elongations of | | Tensile at break in lbs/in² | Per cent ultimate elongation |
|---|---|---|---|---|---|
| Time mins. | Steam pressure lbs. | 300% | 500% | | |
| 10 | 40 | 633 | 1745 | 2595 | 660 |
| 20 | 40 | 935 | 2485 | 3005 | 655 |
| 30 | 40 | 1095 | 2760 | 3885 | 650 |
| 45 | 40 | 1270 | 3020 | 3815 | 640 |
| 60 | 40 | 1215 | 3005 | 3960 | 635 |
| 90 | 40 | 1208 | 2975 | 3525 | 580 |

The above data show that the product formed by reacting the condensation product of beta-beta-dioxydinaphthylmethane and 2,4-diamido-diphenylamine with mercaptobenzothiazole possesses desirable accelerating characteristics. This material is, however, preferably employed in conjunction with a basic organic nitrogen-containing accelerating compound, for example, diphenylguanidine, as a mixed accelerator. Thus, a portion of this material was incorporated in a rubber stock comprising 100    parts of smoked sheet rubber,
    40    parts of carbon black,
    10    parts of zinc oxide,
    3    parts of sulfur,
    2    parts of a blended mineral oil and rosin,
    0.50 part of the 2-mercaptobenzothiazole derivative of the condensation-product of beta-beta-dioxy dinaphthylmethane and 2,4-diamido-diphenylamine,
    0.75 part of diphenylguanidine.

The rubber mix was then vulcanized by heating in a press, for the same times and pressure as in the tests set forth in Table I. The physical characteristics of the rubber stock, after curing, are given in Table II.

*Table II*

| Cure | | Modulus of elasticity in lbs/in² at elongations of | | Tensile in lbs/in² at break | Ultimate elongation per cent |
|---|---|---|---|---|---|
| Time mins. | Steam pressure lbs. | 300% | 500% | | |
| 10 | 40 | 889 | 2390 | 3625 | 680 |
| 20 | 40 | 1390 | 3260 | 4585 | 670 |
| 30 | 40 | 1480 | 3505 | 4750 | 650 |
| 45 | 40 | 1610 | 3770 | 4475 | 600 |
| 60 | 40 | 1625 | 3795 | 4575 | 600 |
| 90 | 40 | 1605 | 3625 | 4265 | 580 |

The above results show that the preferred class of vulcanization accelerators possess greatly increased accelerating power when employed as a component of a mixed accelerator in conjunction with a basic organic nitrogen-containing accelerator, for example, diphenylguanidine.

Another example of the preferred class of accelerators was prepared by reacting substantially two molecular proportions of 2-mercaptobenzothiazole with substantially one molecular proportion of the condensation-product of substantially one molecular proportion of beta-beta-dioxydinaphthylmethane and substantially two molecular proportions of para-para-diamido-diphenylmethane in a manner analogous to that described above.

A portion of the accelerator just described was compounded in a so called pure gum stock in the usual manner comprising 100 parts of pale crepe rubber,
    5 parts of zinc oxide,
    3 parts of sulfur,
    1 part of the 2-mercaptobenzothiazole derivative of the condensation-product of beta-beta-dioxy-dinaphthylmethane and p,p'-diamido-diphenylmethane.

The rubber mix after vulcanization by heating in a press, for different periods of time, exhibited the tensile characteristics indicated in Table III.

*Table III*

| Cure | | Modulus of elasticity in lbs/in² at elongations of | | | Tensile in lbs/in² at break | Per cent ultimate elongation |
|---|---|---|---|---|---|---|
| Time mins. | Steam pressure lbs. | 300% | 500% | 700% | | |
| 10 | 40 | 125 | 230 | 681 | 1920 | 895 |
| 20 | 40 | 136 | 292 | 1015 | 2460 | 865 |
| 30 | 40 | 151 | 345 | 1153 | 2535 | 845 |
| 45 | 40 | 175 | 423 | 1255 | 2655 | 840 |
| 60 | 40 | 147 | 382 | 1215 | 2430 | 825 |
| 90 | 40 | 133 | 378 | 1095 | 2525 | 850 |

The accelerator described above was also employed in conjunction with a basic organic nitrogen-containing accelerator as an activator thereof and with it forming a mixed accelerator. Thus the following rubber stock was compounded:

100 parts of pale crepe rubber,
    5 parts of zinc oxide,
    3 parts of sulfur,
    0.6 parts of diphenylguanidine,
    0.4 parts of the 2-mercaptobenzothiazole derivative of the condensation-product of beta-beta-dioxydinaphthylmethane and p,p'-diamido-diphenylmethane.

The rubber stock was then vulcanized by heating in a press in the usual manner. The results of the tests on the cured rubber product are given in Table IV.

*Table IV*

| Cure | | Modulus of elasticity in lbs/in² at elongations of | | | Tensile in lbs/in² at break | Per cent ultimate elongation |
|---|---|---|---|---|---|---|
| Time mins. | Steam pressure lbs. | 300% | 500% | 700% | | |
| 10 | 40 | 245 | 617 | 2395 | 3495 | 780 |
| 20 | 40 | 241 | 767 | 3140 | 3740 | 710 |
| 30 | 40 | 346 | 918 | 3545 | 3865 | 715 |
| 45 | 40 | 344 | 995 | -------- | 3860 | 695 |
| 60 | 40 | 295 | 941 | 3755 | 3940 | 710 |
| 90 | 40 | 304 | 861 | 3440 | 3595 | 710 |

The data set forth in Table IV show that the accelerator employed is particularly valuable, especially when employed in conjunction with a basic organic nitrogen-containing accelerator, for example, diphenylguanidine.

Another example of the preferred class of accelerators was prepared by reacting substantially two molecular proportions of 2-mercaptobenzothiazole with substantially one molecular proportion of the condensation-product of substantially one molecular proportion of beta-beta-dioxydinaphthylmethane and substantially two molecular proportions of meta-phenylene-diamine in a manner analogous to that described above. The product thus obtained was likewise incorporated in the usual manner in a rubber stock comprising 100 parts of pale crepe rubber
    5 parts of zinc oxide
    3 parts of sulfur
    1 part of the 2-mercaptobenzothiazole derivative of the condensation-product of beta-beta-dioxy-dinaphthylmethane and m-phenylene-diamine.

After vulcanizing the rubber stock thus compounded the cured rubber product was found to possess the tensile and modulus characteristics set forth in Table V.

Table V

| Cure | | Modulus of elasticity in lbs/in² at elongations of | | | Tensile at break in lbs/in² | Per cent ultimate elongation |
|---|---|---|---|---|---|---|
| Time mins. | Steam pressure lbs. | 300% | 500% | 700% | | |
| 10 | 40 | 121 | 224 | 681 | 1915 | 920 |
| 20 | 40 | 143 | 293 | 1080 | 2470 | 850 |
| 30 | 40 | 174 | 357 | 1120 | 2675 | 845 |
| 45 | 40 | 183 | 407 | 1293 | 2635 | 825 |
| 60 | 40 | 195 | 396 | 1200 | 2845 | 865 |
| 90 | 40 | 134 | 327 | 1050 | 2300 | 835 |

This accelerator was also employed in conjunction with diphenylguanidine, thus forming a mixed accelerator, which was incorporated in a rubber mix of the following composition:

100 parts of pale crepe rubber,
    5 parts of zinc oxide,
    3 parts of sulfur,
    0.6 part of diphenylguanidine,
    0.4 part of the 2-mercaptobenzothiazole derivative of the condensation-product of beta-beta-dioxy-dinaphthylmethane and m-phenylene-diamine.

This rubber stock was cured in the usual manner and tested to determine its tensile and modulus properties. The results thus obtained are given in Table VI.

Table VI

| Cure | | Modulus of elasticity in lbs/in² at elongations of | | | Tensile at break in lbs/in² | Per cent ultimate elongation |
|---|---|---|---|---|---|---|
| Time mins. | Steam pressure lbs. | 300% | 500% | 700% | | |
| 10 | 40 | 226 | 575 | 2390 | 3200 | 755 |
| 20 | 40 | 259 | 803 | 3210 | 3880 | 710 |
| 30 | 40 | 305 | 868 | 3465 | 3700 | 710 |
| 45 | 40 | 342 | 1005 | ------ | 3700 | 695 |
| 60 | 40 | 298 | 920 | ------ | 3525 | 685 |
| 90 | 40 | 307 | 934 | ------ | 3145 | 680 |

These data show that the accelerator employed in this case also possesses very desirable properties, especially when employed in conjunction with a basic organic nitrogen-containing accelerator, for example, diphenylguanidine.

Another example of the preferred class of accelerators was prepared by reacting substantially two molecular proportions of 2-mercaptobenzothiazole with substantially one molecular proportion of the condensation-product of substantially one molecular proportion of beta-beta-dioxy-dinaphthylmethane and substantially two molecular proportions of 2,4-toluylene-diamine in a manner analogous to that described above. In order to test its value, a rubber stock was compounded comprising 100 parts of pale crepe rubber,
    5 parts of zinc oxide,
    3 parts of sulfur,
    1 part of the 2-mercaptobenzothiazole derivative of the condensation-product of beta-beta-dioxy-dinaphthylmethane and 2,4 toluylene-diamine.

After vulcanizing the above rubber stock in the usual manner, a cured rubber product having the following physical properties was obtained:

Table VII

| Cure | | Modulus of elasticity in lbs/in² at elongations of | | | Tensile at break in lbs/in² | Per cent ultimate elongation |
|---|---|---|---|---|---|---|
| Time mins. | Steam pressure lbs. | 300% | 500% | 700% | | |
| 10 | 40 | 126 | 217 | 683 | 2030 | 910 |
| 20 | 40 | 152 | 327 | 1065 | 2510 | 845 |
| 30 | 40 | 176 | 348 | 1185 | 2600 | 835 |
| 45 | 40 | 176 | 375 | 1195 | 2785 | 830 |
| 60 | 40 | 190 | 366 | 1135 | 2675 | 855 |
| 90 | 40 | 183 | 366 | 1045 | 2425 | 840 |

This accelerator was also employed in the presence of diphenylguanidine which acts as an activator thereof. Thus, the following rubber stock was compounded:

100 parts of pale crepe rubber,
    5 parts of zinc oxide,
    3 parts of sulfur,
    0.6 part of diphenylguanidine,
    0.4 part of the 2-mercaptobenzothiazole derivative of the condensation-product of beta-beta-dioxy-dinaphthylmethane and 2,4-toluylene-diamine.

Portions of this stock were then cured by heating in a press in the usual manner. The vulcanized product gave the following tensile data as the result of physical tests:

Table VIII

| Cure | | Modulus of elasticity in lbs/in² at elongations of | | | Tensile at break in lbs/in² | Per cent ultimate elongation |
|---|---|---|---|---|---|---|
| Time mins. | Steam pressure lbs. | 300% | 500% | 700% | | |
| 10 | 40 | 218 | 485 | 2000 | 3060 | 770 |
| 20 | 40 | 262 | 680 | 2830 | 3565 | 740 |
| 30 | 40 | 303 | 755 | 3105 | 3870 | 730 |
| 45 | 40 | 318 | 830 | 3460 | 3780 | 720 |
| 60 | 40 | 312 | 810 | 3630 | 3620 | 700 |
| 90 | 40 | 327 | 820 | 3325 | 3550 | 710 |

From the data hereinbefore set forth it is conclusively shown that the new class of materials comprise a group of vulcanization accelerators that are particularly desirable in that they promote complete cure in a short time at 40 pounds of steam pressure per square inch.

In like manner, other condensation products of oxy-di-aryl-alkylidene compounds and diamines than those described above may be reacted with a mercaptoarylthiazole to form further examples of the preferred class of materials. Thus, the condensation-products of beta-beta-dioxydinaphthylmethane and para-phenylene-diamine, of alpha-alpha-dioxydinaphthylmethane and 2,4-diamido-diphenylamine, of tetra-oxydinaphthylmethane and meta-phenylene-diamine, and the like, may be reacted with mercaptobenzothiazole, mercaptotolylthiazole and analogous compounds and employed as rubber vulcanization accelerators.

The present invention is limited only as defined in the following claims, in which it is intended to claim all novelty inherent in the invention as broadly as is permissible in view of the prior art.

What is claimed is:

1. The process of vulcanizing rubber which comprises heating rubber and sulfur in the presence of an accelerator comprising a reaction product of an aromatic diamine-dioxydinaphthylmethane condensate and a mercaptobenzothiazole.

2. The process of vulcanizing rubber which comprises heating rubber and sulfur in the presence of an accelerator comprising a reaction product of a mercaptobenzothiazole and a condensation product of 2,4-diamido-diphenylamine and a dioxydinaphthylmethane.

3. The process of vulcanizing rubber which comprises heating rubber and sulfur in the presence of an accelerator comprising the reaction product of substantially two molecular proportions of 2-mercaptobenzothiazole and substantially one molecular proportion of the condensation product of substantially two molecular proportions of 2,4-diamido-diphenylamine and substantially one molecular proportion of beta-beta-dioxydinaphthylmethane.

4. The vulcanized rubber produced by heating rubber and sulfur in the presence of an accelerator comprising a reaction product of an aromatic diamine-dioxydinaphthylmethane condensate and a mercaptobenzothiazole.

5. The vulcanized rubber produced by heating rubber and sulfur in the presence of an accelerator comprising a reaction product of a mercaptobenzothiazole and a condensation product of 2,4-diamido-diphenylamine and a dioxydinaphthylmethane.

6. The vulcanized rubber produced by heating rubber and sulfur in the presence of an accelerator comprising the reaction product of substantially two molecular proportions of 2-mercaptobenzothiazole and substantially one molecular proportion of the reaction product of substantially two molecular proportions of 2,4-diamido-diphenylamine and substantially one molecular proportion of beta-beta-dioxydinaphthylmethane.

7. The process of vulcanizing rubber which comprises heating rubber and sulfur in the presence of an accelerator comprising a reaction product of a mercaptobenzothiazole and a product formed by reacting a diamido-diphenylamine and a dioxydinaphthylmethane.

8. The process of vulcanizing rubber which comprises heating rubber and sulfur in the presence of an accelerator comprising a reaction product of 2-mercaptobenzothiazole and the condensation product of 2,4-diamido-diphenylamine and beta-beta-dioxydinaphthylmethane.

9. The vulcanized rubber product produced by heating rubber and sulfur in the presence of an accelerator comprising a reaction product of a mercaptobenzothiazole and a product formed by reacting a diamido-diphenylamine and a dioxydinaphthylmethane.

10. The vulcanized rubber product produced by heating rubber and sulfur in the presence of an accelerator comprising a reaction product of 2-mercaptobenzothiazole and the condensation product of 2,4-diamido-diphenylamine and beta-beta-dioxydinaphthylmethane.

11. The process of vulcanizing rubber which comprises heating rubber and sulfur in the presence of a mixture of accelerators comprising a reaction product of a mercaptobenzothiazole and a product formed by reacting an aromatic diamine with a dioxydinaphthylmethane, and diphenylguanidine.

12. The process of vulcanizing rubber which comprises heating rubber and sulfur in the presence of a mixture of accelerators comprising a reaction product of 2-mercaptobenzothiazole and the condensation product of 2,4-diamido-diphenylamine and beta-beta-dioxydinaphthylmethane, and diphenylguanidine.

13. The process of vulcanizing rubber which comprises heating rubber and sulfur in the presence of an accelerator comprising the reaction product of substantially two molecular proportions of 2-mercaptobenzothiazole with substantially one molecular proportion of the reaction product of substantially two molecular proportions of 2,4-diamido-diphenylamine and substantially one molecular proportion of beta-beta-dioxydinaphthylmethane, activated by diphenylguanidine.

14. The vulcanized rubber product produced by heating rubber and sulfur in the presence of a mixture of accelerators comprising a reaction product of a mercaptobenzothiazole and a product formed by reacting an aromatic diamine with a dioxydinaphthylmethane, and diphenylguanidine.

15. The vulcanized rubber product produced by heating rubber and sulfur in the presence of a mixture of accelerators comprising a reaction product of 2-mercaptobenzothiazole and the condensation product of 2,4-diamino-diphenylamine and beta-beta-dioxydinaphthylmethane, and diphenylguanidine.

16. The process of vulcanizing rubber which comprises heating rubber and sulfur in the presence of an accelerator comprising a reaction product of an aromatic diamino reaction product of an oxydi-naphthyl-alkylidene compound and a mercaptobenzothiazole.

17. The vulcanized rubber product produced by heating rubber and sulfur in the presence of an accelerator comprising a reaction product of an aromatic diamino reaction product of an oxy-di-naphthyl-alkylidene compound and a mercaptobenzothiazole.

In testimony whereof I hereunto affix my signature.

ROBERT L. SIBLEY.